Ezra B. Lake—Improvement in Scales.

No. 72864

PATENTED DEC 31 1867

Witnesses:
Wm. Abbit Stub.
J. Parker.

E. B. Lake
By his Att'y
H. Howson

United States Patent Office.

EZRA B. LAKE, OF BRIDGEPORT, NEW JERSEY.

Letters Patent No. 72,864, dated December 31, 1867.

IMPROVEMENT IN SCALES.

The Schedule referred to in these Letters Patent and making part of the same.

TO ALL WHOM IT MAY CONCERN:

Be it known that I, EZRA B. LAKE, of Bridgeport, New Jersey, have invented an Improvement in Scales; and I do hereby declare the following to be a full, clear, and exact description of the same.

My invention consists of a vibrating frame or beam of a scale, a graduated plate or plates, and a weight, controlled by a graduated arm or arms, all combined substantially as described hereafter, so that the weight of an article, and its value at a specified price per pound, may be simultaneously ascertained without the necessity of calculation, the instrument being, in fact, a combined scale and ready reckoner of the value of the article weighed.

In order to enable others skilled in the art to make and use my invention, I will now proceed to describe its construction and operation, reference being had to the accompanying drawing which forms a part of this specification, and in which—

Figure 1:
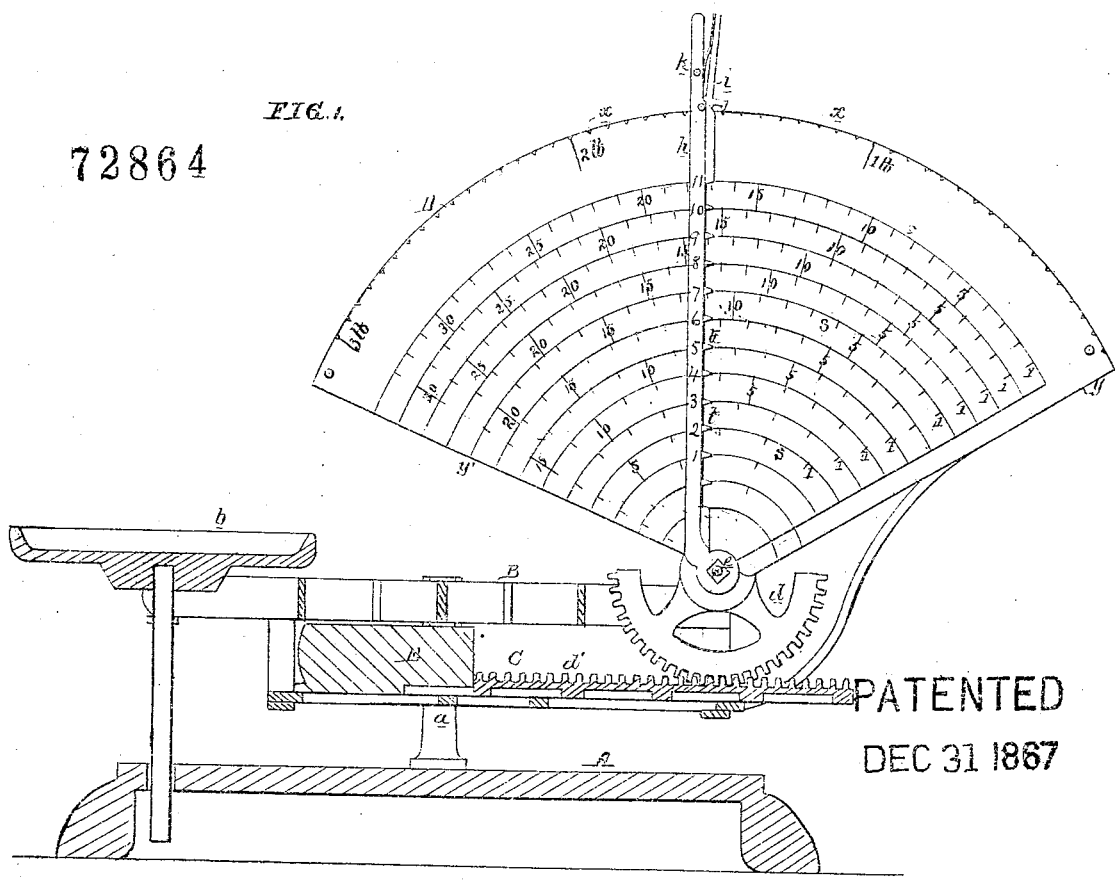

Figure 1 is a sectional elevation of my improved scale, and

Figure 2:
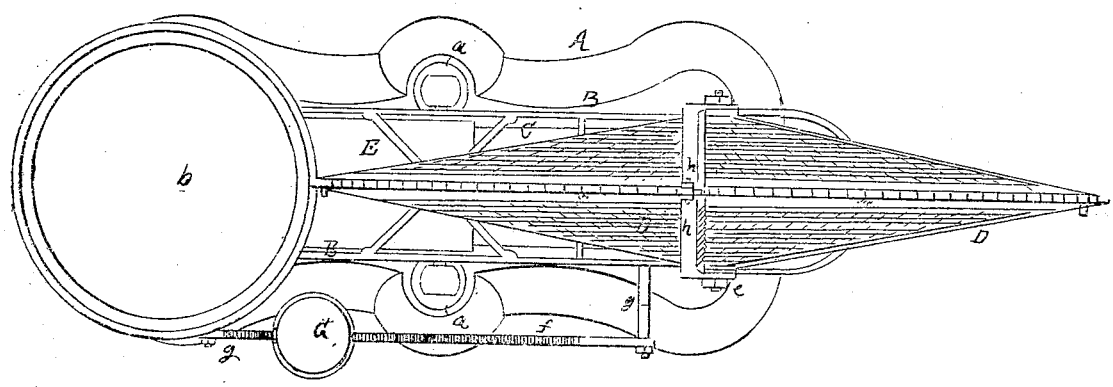

Figure 2 a plan view.

To a base-plate, A, are secured standards $a\ a$, between which is suspended a frame, B, knife-edged projections on the latter bearing in the said standards. At one end of the frame is a platform, $b$, similar to that of ordinary scales, and in bearings, at the opposite end of the frame, turns a spindle, $e$, to which is secured a toothed segment, $d$, gearing into a rack, $d'$, on a plate, C, which is arranged to slide on guides on the frame. To the inner end of the plate C is secured a weight, E, and on a graduated bar, $f$, secured to arms $g$, projecting from the frame B, slides a tare-weight, G. To the frame B are attached two segmental plates, D D', which are secured together at their curved edges $x$, but diverge towards their lower edges $y\ y'$, as shown in the drawings, the plates being so arranged that the edges $x$ shall be in the arc of a circle, of which the spindle $e$ is the centre. To the opposite ends of this spindle are secured to lower ends of arms $h\ h'$, which are connected together at their upper ends by a handle, $k$, the point of a spring-catch, $i$, hung to the said handle, being adapted to notches arranged at equal distances apart in the edges $x$ of the segmental plates. On the face of the plate D are lines $s\ s$, arranged at equal distances apart, and concentric with each other and with the edge $x$ of the plate, and at one edge of the arm $h$ are projections $t$, which coincide with the lines $s$, the face of the arm having upon it a series of numbers, each of which is opposite one of the projections $t$.

By moving the arms $h\ h'$ in one direction or the other, the weight E is carried to or from the centre of vibration of the frame B, the weight being so proportioned that when the arms are parallel to the edges $y$ of the plate D, the frame will be balanced. The upper edge $x$ of the plate D is so graduated that the weight of an article on the platform $b$ will be indicated by the position of the arm $h$ on the said graduated edge, after the weight E has been adjusted so as to balance the scale, while the lines $s$ are so graduated that the value of the article weighed will be indicated by the number on the plate D, adjacent to the edge of the arm $h$, and opposite to the number on the latter, which corresponds to the price per pound of the article weighed.

When, for instance, the arm is moved to the position shown in fig. 1, and the weight E is thereby so adjusted as to balance the article upon the platform, the position of the arm, midway between the figs. 1 and 2, on the graduated edge $x$, shows that the weight of the article is one pound and a half, while the number 6, on the plate D, adjacent to the edge of the arm, and opposite the number 4, on the latter, indicates the value of one and a half pound of the article at four cents per pound. Should the price of the article be ten cents per pound, the number 15, on the plate D, opposite the number 10, on the arm $h$, indicates the value of one and a half pound.

In like manner the weight and value of articles of any size and price may be simultaneously ascertained, and the loss of time and liability to commit errors, which result, when the ordinary modes of calculating are employed, are avoided.

Both the plates D D' may be graduated, or a single plate, with graduations on both sides, may be used, and different arrangements of graduation may be employed without departing from the main features of my invention.

Without confining myself to the precise construction and arrangement of parts herein described, or to the exact system of graduation illustrated, I claim as my invention, and desire to secure by Letters Patent—

The combination of a vibrating frame or beam of a scale, a graduated plate or plates, and a weight, controlled by a graduated arm or arms, all substantially as and for the purpose herein set forth.

In testimony whereof, I have signed my name to this specification in the presence of two subscribing witnesses.

EZRA B. LAKE.

Witnesses:
    CHARLES E. FOSTER,
    JOHN WHITE.